United States Patent [19]

Shuster et al.

[11] Patent Number: 5,665,481

[45] Date of Patent: Sep. 9, 1997

[54] METAL-AIR BATTERY

[75] Inventors: Nicholas Shuster, Madison, Ohio; Harvey N. Seiger, Boynton Beach, Fla.; Daniel J. Spak, Cuyahoga Falls; David E. Harney, Twinsburg, both of Ohio

[73] Assignee: Northrop Grumman Corporation, Los Angeles, Calif.

[21] Appl. No.: 557,440

[22] Filed: Nov. 14, 1995

[51] Int. Cl.$^6$ ........................................ H01M 12/06
[52] U.S. Cl. ........................................ 429/27; 429/29
[58] Field of Search ........................ 429/27, 46, 29, 429/72

[56] References Cited

U.S. PATENT DOCUMENTS

| | | | |
|---|---|---|---|
| 4,184,008 | 1/1980 | Watakabe | 429/27 |
| 4,184,009 | 1/1980 | Armstrong | 429/27 |
| 4,584,249 | 4/1986 | Smithrick | 429/57 |

*Primary Examiner*—M. Nuzzolillo
*Attorney, Agent, or Firm*—Walter G. Sutcliff

[57] ABSTRACT

A metal-air battery having a liquid electrolyte above which is an air plenum. The battery includes a horizontally or vertically disposed anode completely within the electrolyte and a reticulated cathode arrangement which floats at the surface of the electrolyte and can accommodate for changes in the liquid level.

16 Claims, 9 Drawing Sheets

METAL-AIR BATTERY

BACKGROUND OF THE INVENTION

1. Field of the Invention

This invention in general relates to electrochemical cells, and more particularly to a metal-air battery which exhibits long life.

2. Description of Related Art

Metal-air batteries are typically used to provide power for long, unattended operating periods such as may be required for railroad signaling devices and channel buoys, by way of example.

Conventional metal-air battery designs utilize a so-called "air cathode" constituted by a vertically oriented extremely thin wire reinforced porous carbon structure. As will be described, due to the particular design and the relatively fragile cathode, such batteries typically last approximately one year or less.

The present invention provides for an improved metal-air battery which will provide power over a relatively longer operating period than conventional metal-air batteries.

SUMMARY OF THE INVENTION

The improved metal-air battery in the present invention includes a case having an interior partially filled with an electrolyte solution. An anode is positioned submerged within the electrolyte and a porous cathode arrangement is provided at the surface of the electrolyte in a manner such that a portion thereof is within the electrolyte and the remainder is above the surface. In a preferred embodiment, the cathode arrangement is floating at the surface of the electrolyte and includes a reticulated metallic foam cathode having a suitable catalyst deposited thereon. Flotation may be provided by a floatable collar surrounding the cathode. Suitable leads are connected to both the anode and cathode for intended operation.

DESCRIPTION OF THE PREFERRED EMBODIMENTS

Figure 1:
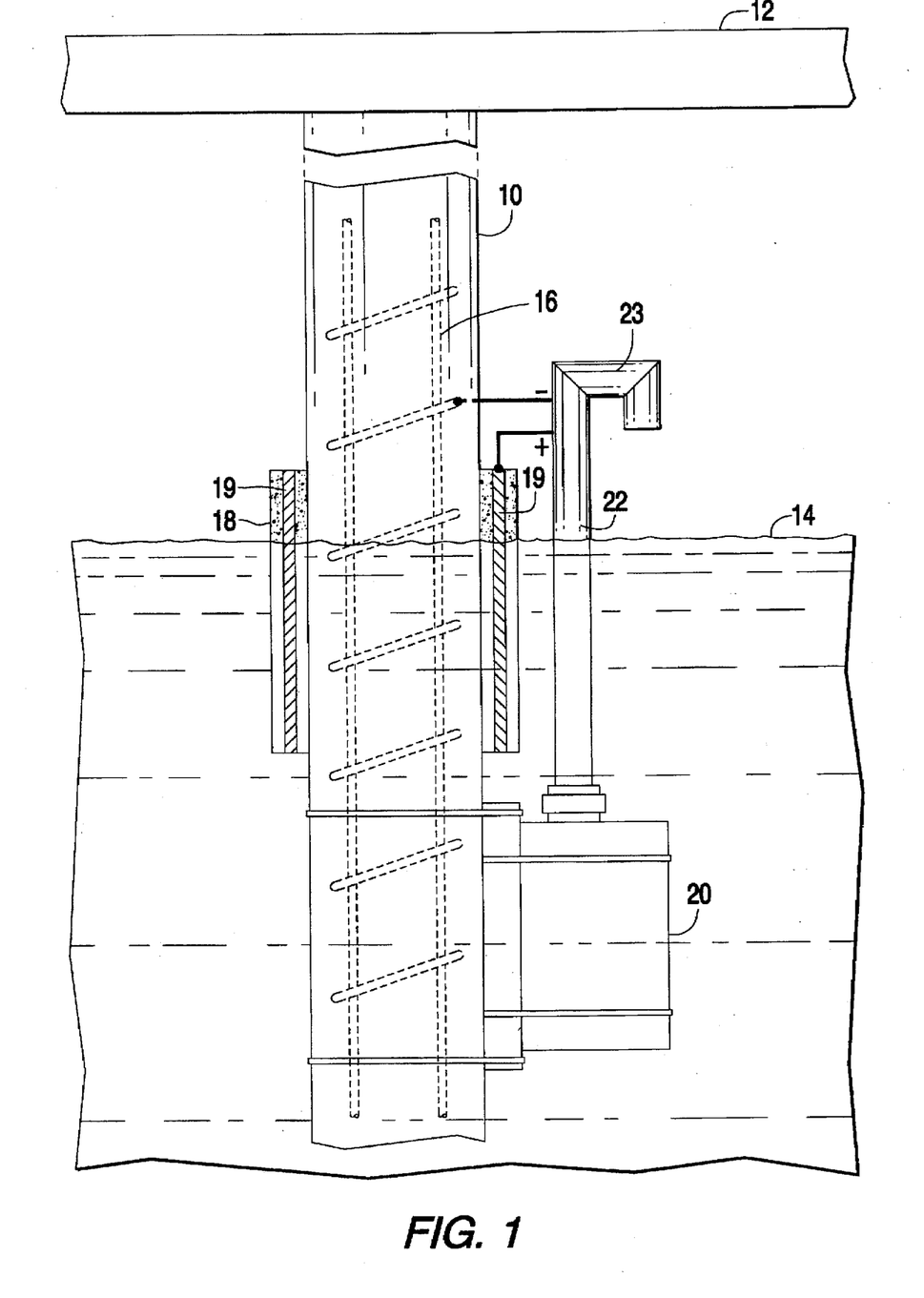
FIG. 1 illustrates an environment in which the present invention may be utilized.

FIG. 1 illustrates use of a metal-air battery in a remote cathodic protection installation for bridges and marine structures constructed of steel reinforced concrete.

In FIG. 1 a concrete piling 10 supports a road deck 12 over a body of saltwater 14. The reinforcing bars 16 in the concrete pilings are attacked by the combination of air and saltwater, eventually resulting in spauling of the concrete and exposure of the reinforcing bars. The situation manifests itself in a splash zone which is the region between low-tide water level and approximately 3 feet above high-tide water level. To prevent this action, a cathodic protection arrangement may be utilized.

In one type of cathodic protection arrangement, an appropriate voltage is applied between the reinforcing bar 16 and an inert anode positioned within a jacket 18 in the splash zone. The anode 19 is connected to the positive element of a battery 20 shown affixed to piling 10 in the water below the splash zone, while the reinforcing bars 16 are connected to the negative element of the battery. Air for the metal-air battery is supplied via a standpipe 22 having a U-shaped section 23 at the upper end thereof to prevent the elements, and debris, from falling into the battery 20.

Figure 2:
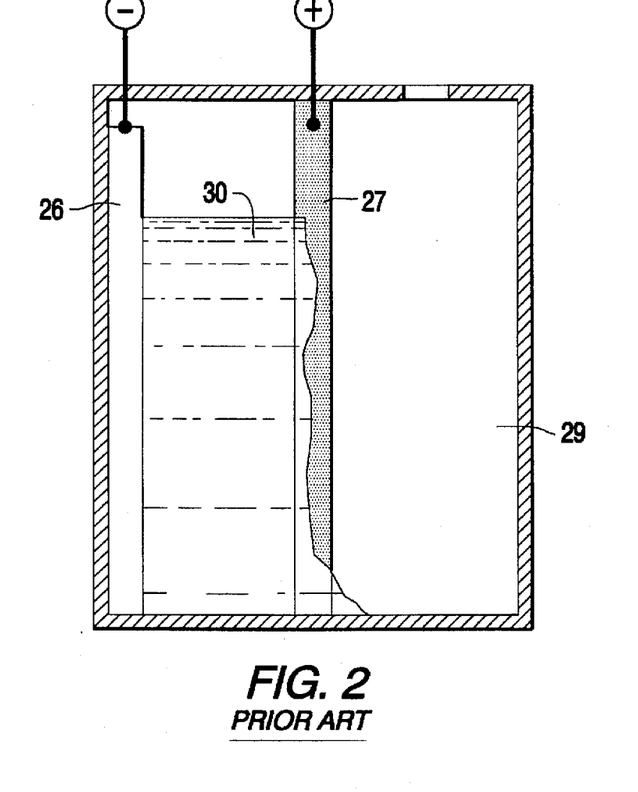
FIG. 2 is a simplified presentation of a typical prior art metal-air battery.

FIG. 2 illustrates a conventional metal-air battery which includes an anode 26 and an air cathode 27, both vertically oriented. A chamber 29 forming an air plenum is located on one side of the cathode 27 while the volume between the anode and cathode is substantially filled with a liquid electrolyte 30. The air cathode makes use of the oxygen from the atmosphere as one of the reactants. The reaction which occurs at the air cathode is:

2 H$_2$O(from electrolyte)+O$_2$(from the atmosphere) +solid catalyst+4 electrons→4OH$^-$    (Eq. 1)

From the above, oxygen from the atmosphere is reduced in the presence of water from the electrolyte to form hydroxyl ions. In order to carry out the reaction, a catalyst is needed to aid the oxygen reduction and a conventional air cathode utilizes wire reinforced porous carbon impregnated with an oxygen reduction catalyst such as platinum.

The porosity and wetting characteristics of the air cathode must be carefully adjusted such that the liquid does not flood through the cathode particularly at the bottom where the pressure differential across the cathode structure is the highest. Any flooding prevents oxygen from reaching the active catalyst sites in the pores of the cathode and the effectiveness of the cathode is reduced or destroyed. Accordingly, the height of the electrolyte is limited to approximately 12 inches or less. As water is lost from the electrolyte, either through reaction at the electrode (Equation 1), or evaporation, the liquid level in the battery drops and the effective active area of the air cathode decreases proportionately thus preventing long-life, multi-year operation.

Figure 3:
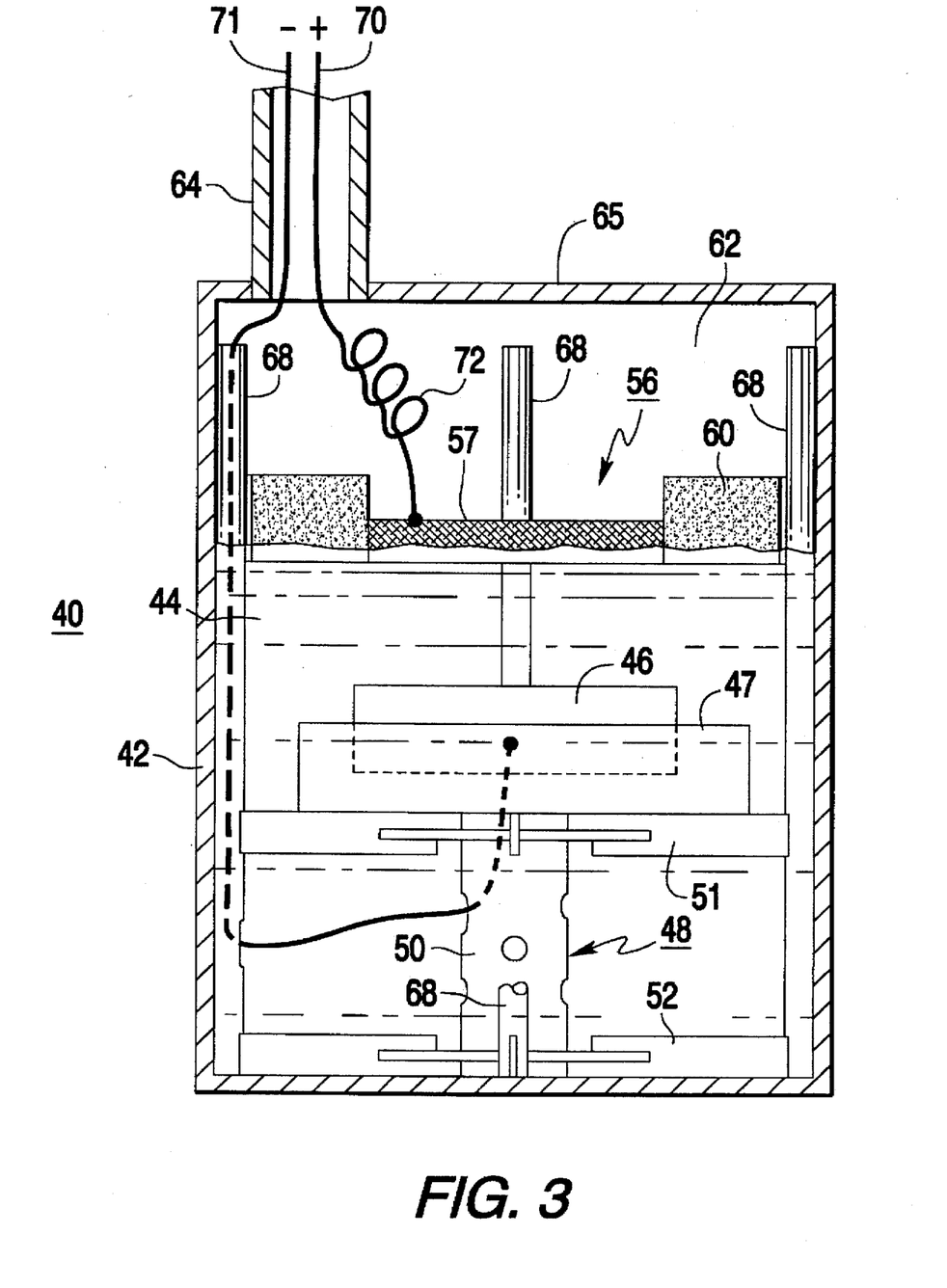
FIG. 3 is a simplified presentation of one embodiment of the present invention.
Figure 4:
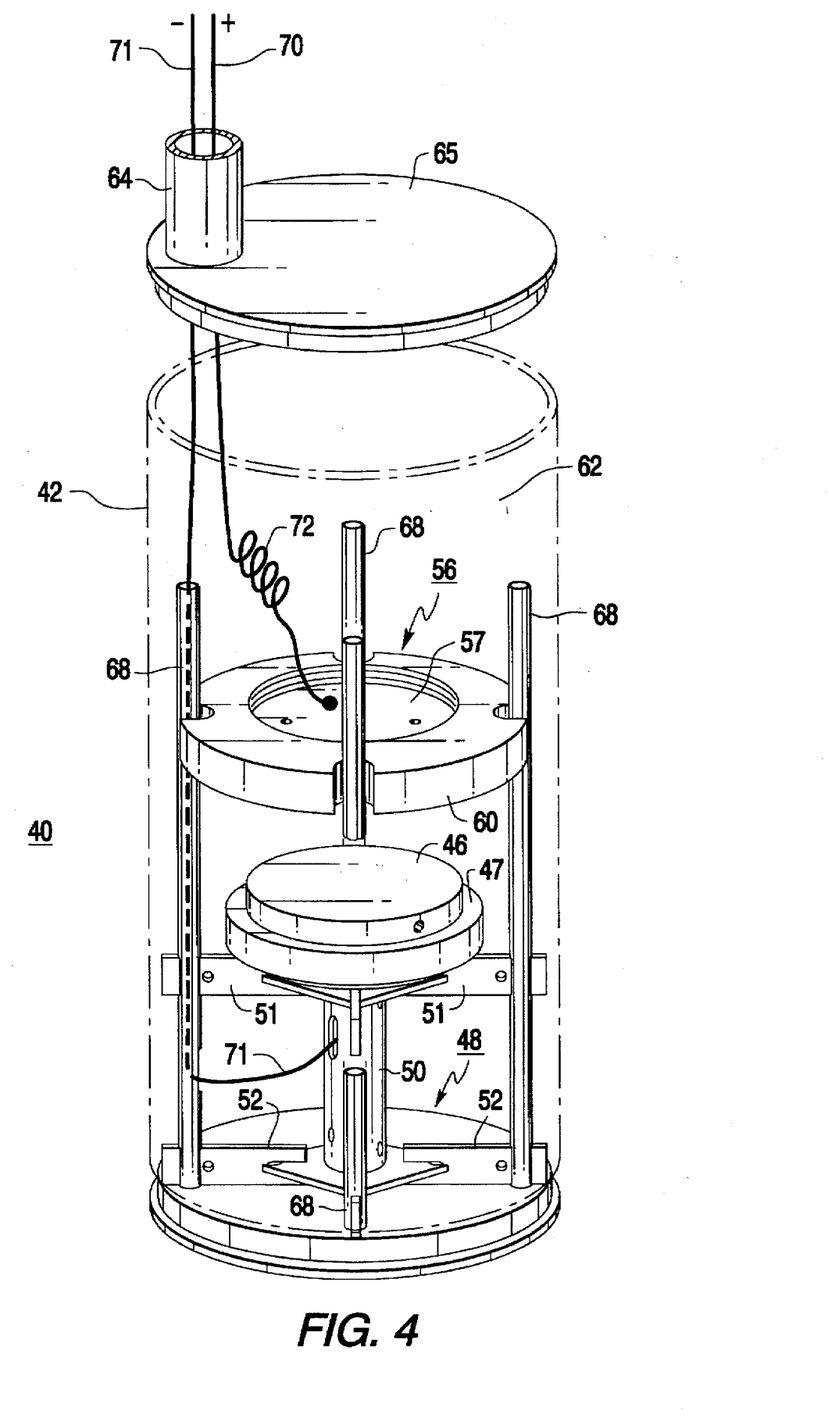
FIG. 4 is a pictorial view of the battery of FIG. 3.

The present invention circumvents these problems, and to this end reference is made to FIGS. 3 and 4 illustrating an improved metal-air battery 40 in accordance with one embodiment of the present invention. Battery 40 includes a case 42 (shown in phantom line in FIG. 4) partially filled with an electrolyte 44 such as a potassium hydroxide solution which is stable over a wide range of temperatures and will not freeze until the ambient temperature drops below −40° F.

The battery includes an anode 46 such as of zinc and contained within an anode holder 47 such that only a portion of the anode surface is exposed to the electrolyte 44. The anode is completely immersed in the electrolyte 44 and is held in position by means of a support structure.

One example of a support structure, 48, includes an apertured vertical support tube 50 affixed to the underside of anode holder 47 and to which is connected upper and lower laterally extending arms 51 and 52.

The battery includes an air cathode arrangement 56 at the surface of the electrolyte positioned such that a portion of the cathode is within the electrolyte and the remainder is above the surface. Cathode arrangement 56 includes cathode 57 which is not a thin, fragile carbon-based electrode but rather a rigid, rugged, reticulated foam structure which may be 0.5 inches thick and coated with a catalytic layer of silver or similarly effective oxygen reduction catalyst. One type of reticulated structure which may be used is a commercially available metallic foam such as nickel foam, and having a porosity of approximately 40–45 pores per inch. Such structure can be cut into circles, squares or any geometric shape.

In the embodiment illustrated, the air cathode 57 is horizontally disposed and floats at the surface of the electrolyte 44. This is accomplished by means of a float collar in the form of a float ring 60 of a material such as a closed cell polyolefin foam the arrangement being sized to cover substantially all of the electrolyte surface. Such arrangement prevents needless evaporation and contributes to long life. As the electrolyte level in the battery drops due to consumption of water, the float ring simply tracks the change in liquid level and continuously maintains the required interface whereby the cathode 57 is in contact with the liquid electrolyte 44 as well as air supplied to chamber 62 from outside of the battery by means of a standpipe 64 connected to the top 65 of case 42.

As an alternative to the floating cathode arrangement, a stationary horizontal cathode may be supported in place at the electrolyte surface and would be of a thickness to accommodate changes in electrolyte level.

The tracking of the liquid level by means of float ring 60 is aided with the provision of a plurality of guides in the form of vertical rods 68 which may be held in position by the upper and lower laterally extending support arms 51 and 52.

Suitable electrical connection is made to the electrodes by means of positive and negative electrical leads 70 and 71 connected respectively to the cathode 57 and anode 46. In order to accommodate for vertical movement of the cathode arrangement 56, the positive electrical lead 70 may be provided with a plurality of loops 72. The negative lead 71 may be connected to the underside of cathode 46 via apertured vertical support tube 50.

Figure 5:
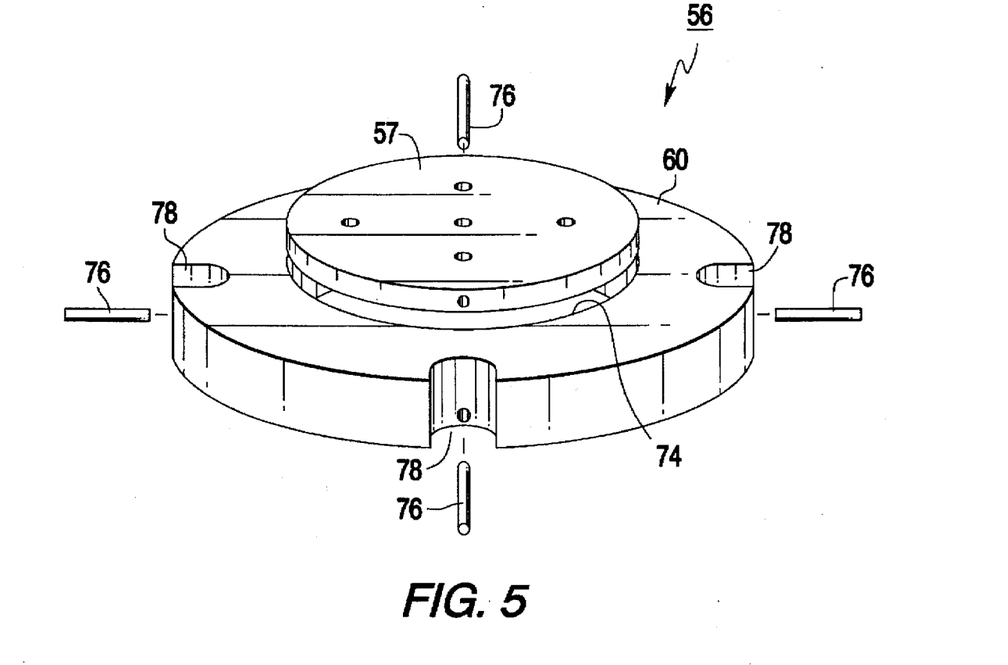
FIG. 5 is an exploded view of the floating cathode arrangement of the battery.

FIG. 5 is an exploded view of the air cathode arrangement 56. The cathode 57 is in the form of a right circular cylinder of a diameter which matches the diameter of inner aperture 74 of float ring 60. The cathode 57 is set into aperture 74 such that the lower surface of cathode 57 is even with the lower surface of float ring 60 and is held in place by means of a plurality of dowel pins 76.

Figure 6:
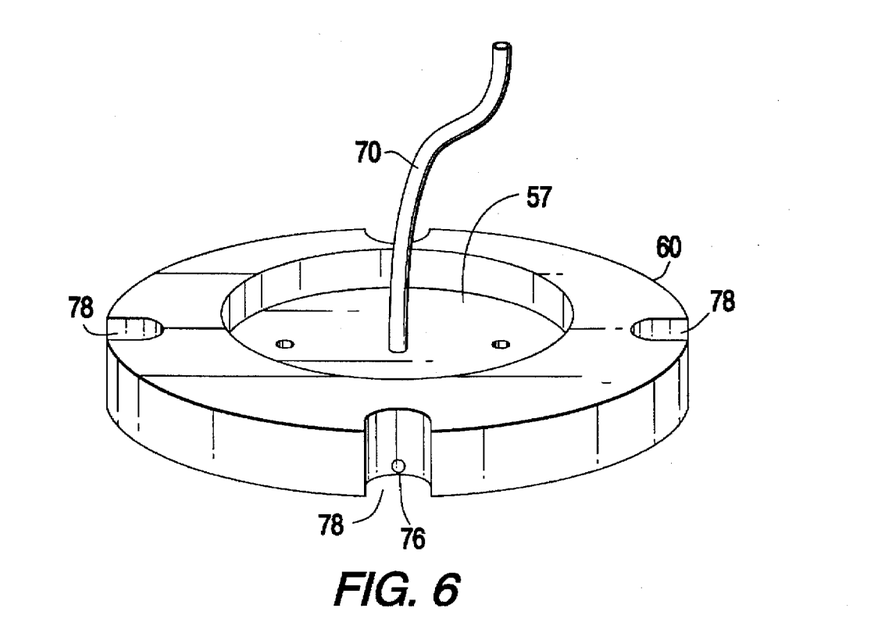
FIG. 6 is an assembled view of the floating cathode arrangement.

In order to accommodate for movement along the vertical guide rods 68, the float ring includes a plurality of cutouts in the form notches 78 which receive a respective one of the guide rods 68. In this manner the cathode 57 can move vertically without any twisting. After the cathode is in position, and as illustrated in FIG. 6, electrical lead 70 suitably coated for insulative protection against the electrolyte, can be electrically connected to cathode 57 such as by means of conductive silver epoxy.

Figure 7:
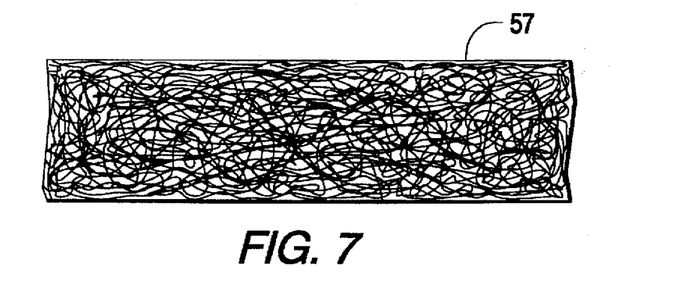
FIG. 7 is illustrative of a reticulated metallic foam which may be used as the cathode in the present invention.

FIG. 7 illustrates a section of the reticulated cathode. As previously stated, the reticulate can be formed of a nickel metal foam, however any reticulate that can accept the deposited silver catalyst may be utilized. In order to prevent capillary wicking and flooding of the active silver surface on the reticulate, the cathode 57 is wet-proofed with a suitable hydrophobic coating.

Figure 8:
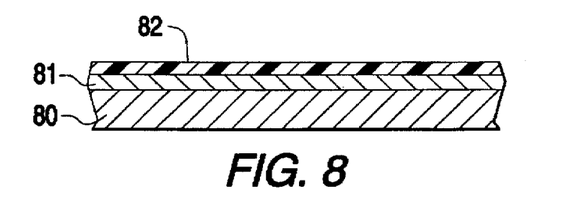
FIG. 8 is a cross-sectional view of various coatings which are applied to the metallic fibers of the metallic foam of FIG. 7.

A strand 80 of the reticulated cathode 57 is illustrated in FIG. 8 together with a coating of the oxygen reduction catalyst such as silver 81. The hydrophobic coating 82 such as polytetrafluroethylene may then be deposited on the silver layer 81. However, in a preferred embodiment, the hydrophobic coating may be constituted by a fluorinated ethylene-propylene (FEP). Cathode 57 may be coated by dipping or flowing the FEP onto the surface followed by a drying and heat treatment. Drying can be done with infrared lamps or in a forced air convection oven for a minimum of 15 minutes. After drying, a baking or volatilization of the wetting agent and melting of the FEP is carried out in an air oven maintained at a temperature of 280° C. A dwell time of approximately 15 minutes is preferred for removing traces of residue from the wetting agent. The major advantage of using FEP for wet proofing air cathodes is the lower melting point which allows a lower process temperature.

Figure 9:
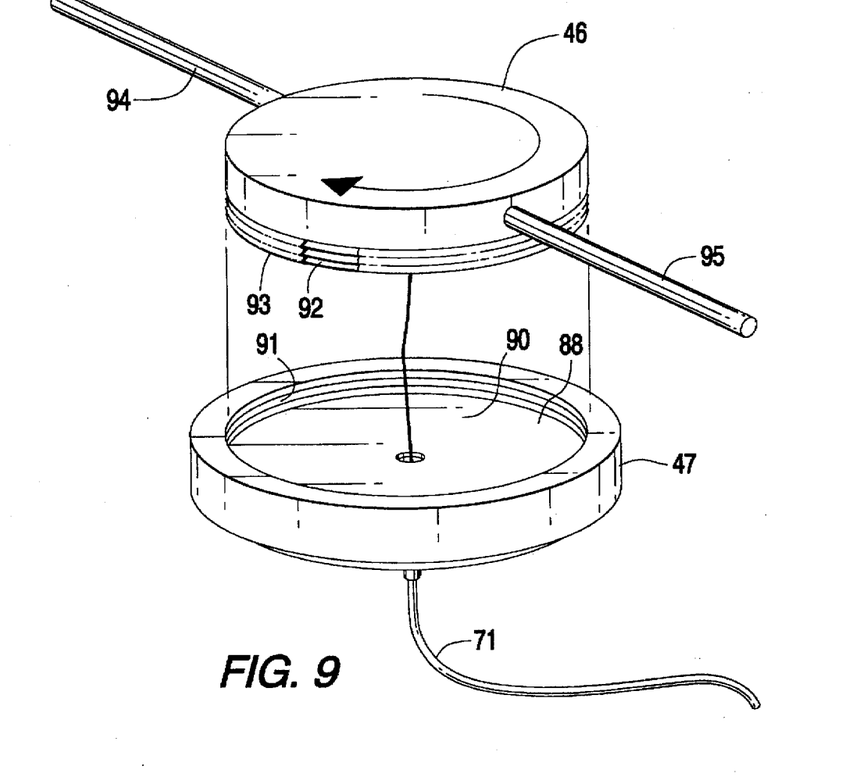
FIG. 9 is a view illustrating the placement of the anode of the battery into a battery holder.

In FIG. 9, the anode 46 is shown being inserted into the anode holder 47 which may be of a plastic material such as PVC. In order to seal the bottom of the anode and eliminate creep of the electrolyte under the anode, a rubber-face gasket 88 is positioned within a cavity 90 of the anode holder 47, the inner wall of which is threaded as at 91 to accommodate threads 92 on the lower portion of anode 46. Teflon tape 93 on threads 92 constitute additional sealing means for excluding the electrolyte from the unexposed portion of the anode 46 when it is positioned within the holder 47 and immersed in the electrolyte.

Figure 10:
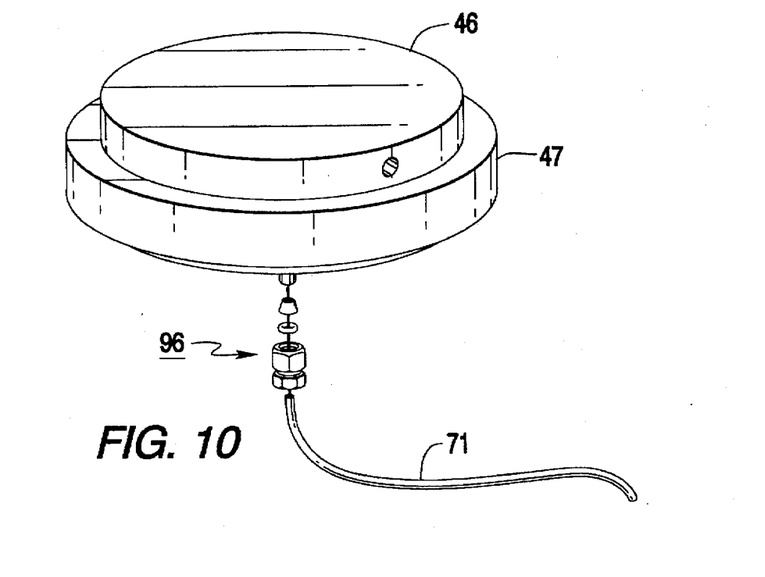
FIG. 10 illustrates the anode situated in its holder.

Electrical lead 71 suitably insulated against the electrolyte, passes through the bottom of the anode holder 47 and makes electrical contact with the anode 46. Rods 94 and 95 may be inserted into pre-drilled apertures in anode 46 for screwing the anode 46 into the anode holder 47 and thereafter removed, as illustrated in FIG. 10 which also illustrates an exploded view of a connecting arrangement 96 by which lead 71 is connected to anode 46.

Figure 11:
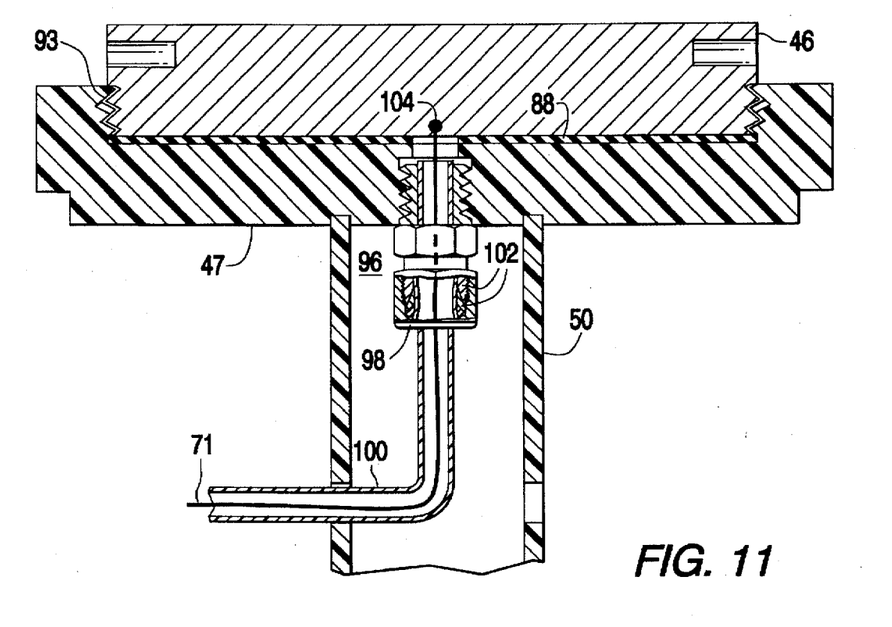
FIG. 11 is a cross-sectional view showing the anode arrangement in more detail.

The assembled and electrically connected anode is further illustrated in FIG. 11. The connecting arrangement 96 includes a pipe-to-tubing connector 98 which allows for a corrosion resistant and inexpensive polyethylene tube 100 protecting the negative lead 71 to be introduced to the underside of anode 46. The fitting 98 is sealed in place by means of stainless steel ferrules 102. Lead 71 within tube 100 passes up through the connecting arrangement 96 and is electrically connected to the bottom of the metal anode 46 by a suitable connection 104. With this arrangement no electrolyte can enter tube 100 and neither the negative lead 71 nor the connection 104 are exposed to electrolyte thus eliminating the possibility of localized short circuits developing.

Figure 12:
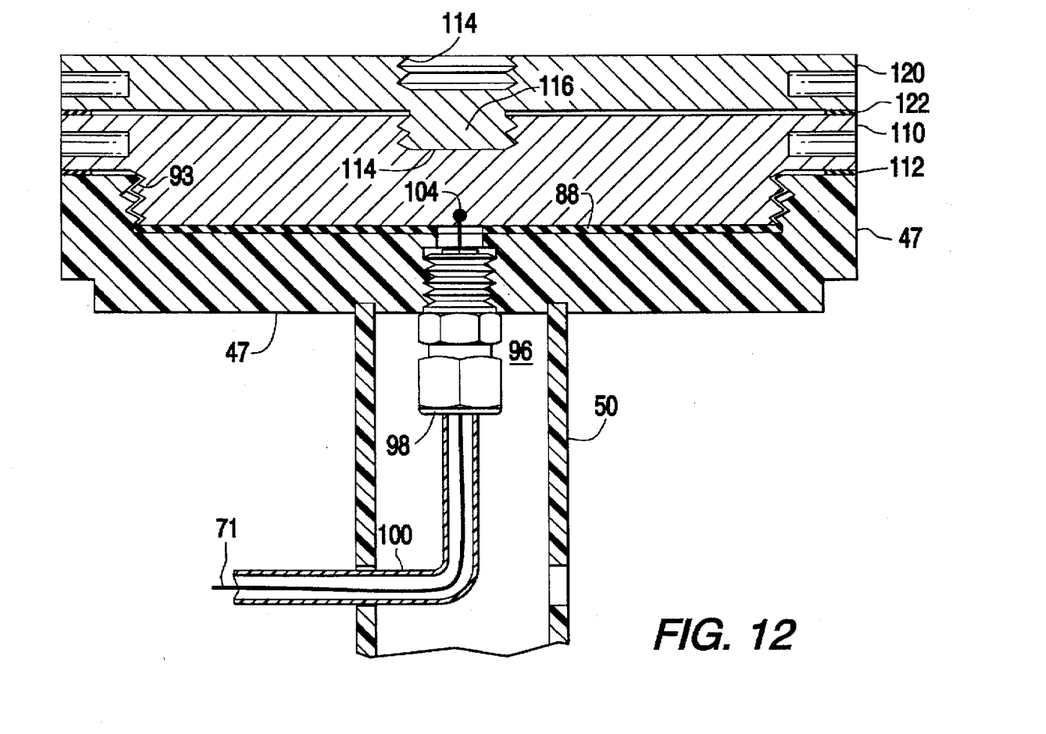
FIG. 12 illustrates an anode arrangement for increasing the volume of anode utilized.

Additional capacity, and hence longer life, can be added to the anode by either initially supplying a thicker anode or by an arrangement such as illustrated in FIG. 12. Anode 110, generally in the shape of an inverted top hat, is threadily secured to the anode holder 47 with gasket 88 and teflon tape 93 wrapped around the threaded portion of anode 110. A sealing gasket 112 is provided on the undersurface of the rim of the anode 110 to prevent ingress of electrolyte. Anode 110 includes a threaded recess 114 to accommodate a matching threaded extension 116 on a supplemental anode 120 which may also include a threaded recess on the top thereof to, in turn, accommodate another supplemental anode. In this manner, the required thickness of anode may be built up using supplemental anodes of standard or various thicknesses. A second sealing gasket 122 is utilized to prevent ingress of electrolyte between anodes 110 and supplemental anode 120.

Figures 13, 14:
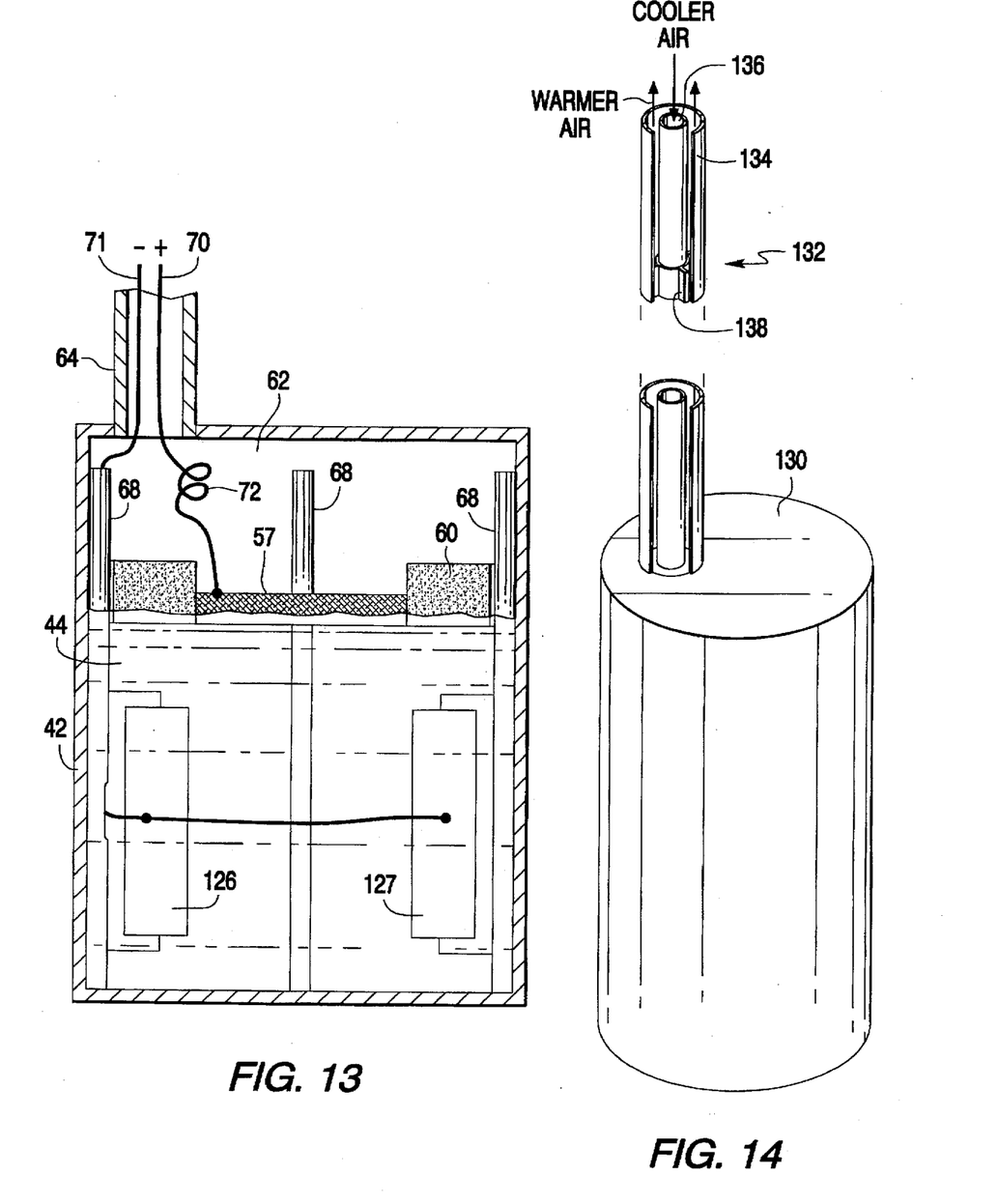
FIG. 13 illustrates an alternate embodiment of the present invention.
FIG. 14 is a view of a preferred embodiment of a standpipe utilized in conjunction with the battery.

In the configuration of the battery thus far described, the major active area of the anode is a flat planar surface horizontally disposed and facing upward toward and parallel with the electrolyte-air interface. FIG. 13 illustrates another embodiment of the battery wherein the anode is vertically oriented. FIG. 13 illustrates, by way of example, two anodes 126 and 127 completely submerged and facing one another in the electrolyte 44. The negative electric lead 71 would be arranged to be in electrical contact with both anodes. Although not illustrated, the anode structure could be constituted by a single hollow cylinder around the inner peripheral wall portion of the case 42. The vertical orientation of the cathode or cathodes advantageously allows any solid reaction products which might form on the surface of the anode to fall off and drop to the bottom of the battery case 42.

As previously discussed, in the metal-air battery oxygen is reduced in the presence of water to form hydroxyl-ions as indicated by Equation 1. Since oxygen is consumed as the battery is discharged, a continuous supply of air is needed to keep the battery operating. If the battery is mounted underwater or buried in the earth in a cathodic protection arrangement, air is supplied by means of the standpipe 64 which serves as a snorkel or breather tube. As oxygen is consumed it is replaced by convection of fresh air down the standpipe. Several factors influence the rate of replenishment of the oxygen and include the length and diameter of the pipe, temperature variations down the length of the pipe and wind velocity. FIG. 14 illustrates an arrangement for supplying required air to the battery used in warm weather climates.

The metal-air battery 130 of FIG. 14 includes a standpipe 132 which will provide sufficient air so that battery performance is not degraded. If the battery 130 is in a relatively cool position such as under water, the upper portion of a standpipe may be exposed to the hot sun resulting in a possible thermal blockage and a consequent reduced air flow. Standpipe 132 obviates this by its construction including an outer pipe 134 as well as an inner pipe 136 coaxial therewith and maintained in position by means of one or more spiders 138. The thus formed double walled pipe creates a convective circulation by means of the temperature difference between the two pipe walls. Cooler air is denser and sinks relative to hotter air. This differential temperature effect creates turbulence and movement of the air within the standpipe 132 whereby fresh air becomes mixed with the air in the standpipe and oxygen is sufficiently replenished.

Figure 15:
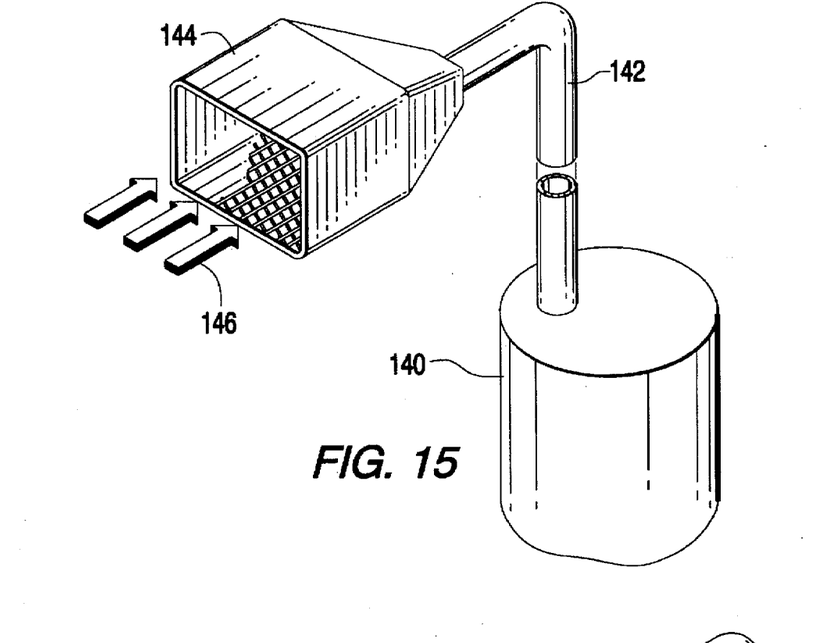
FIGS. 15 and 16 illustrate an arrangement for supplying the battery with air in a windy environment.
Figure 16:
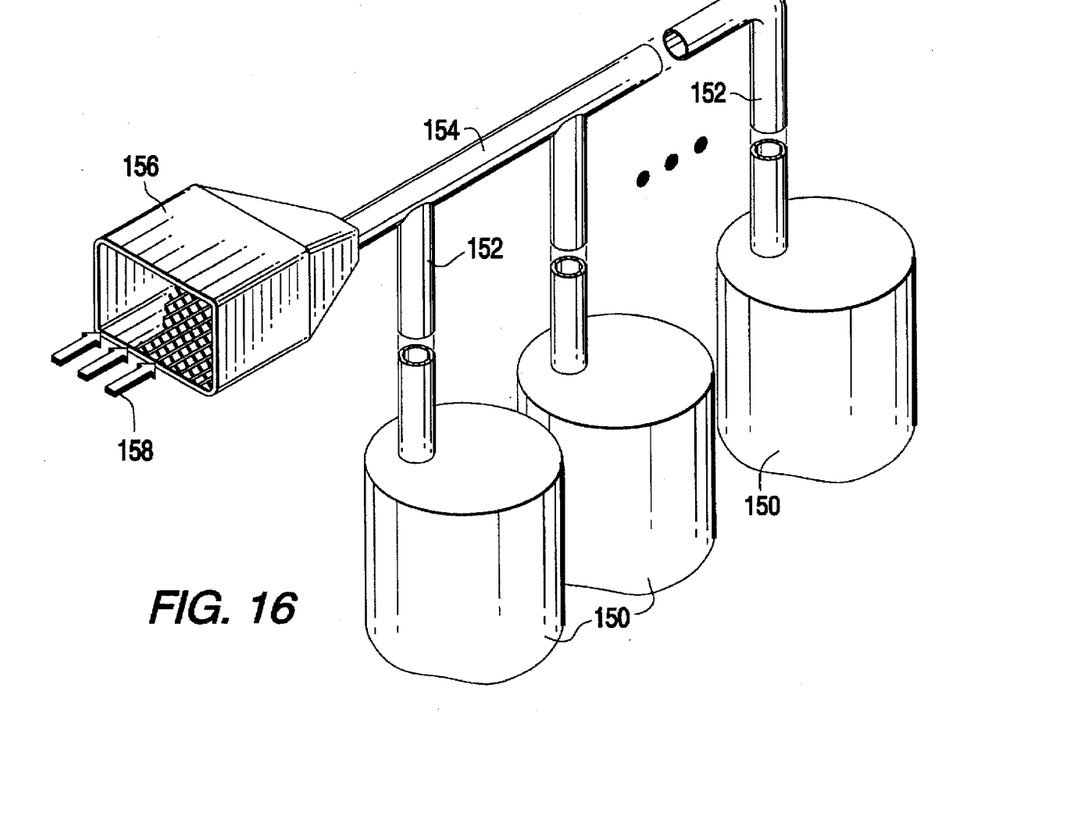

FIG. 15 illustrates an arrangement for supplying sufficient oxygen to a metal-air battery 140 wherein the apparatus is located in a high wind velocity area. A standpipe 142 for the battery 140 is connected to an enlarged air scoop or plenum 144 oriented in the path of expected high winds as indicated by arrows 146. Where a plurality of metal-air batteries are utilized such as depicted by metal-air batteries 150 in FIG. 16, the standpipes 152 from these batteries may be connected to a manifold 154 which is connected to an air scoop or plenum 156 positioned in the path of high wind velocity as indicated by arrows 158.

With the battery construction herein described water loss from the electrolyte is minimal on a day-to-day basis thus permitting long life operation without a requirement for replenishment of water. If several inches of water does evaporate over the course of many years, the floating cathode tracks the drop in liquid level with no loss in performance. Another advantage of the battery construction is that the internal structure may be assembled as a package and then easily inserted into a normal container in which the electrolyte is shipped, which then will serve as the battery case thus eliminating handling of the corrosive caustic electrolyte. Battery activation is then accomplished by opening the lid of the container inserting the battery pack and replacing the lid with an air breather tube attached.

We claim:

1. An improved metal-air battery, comprising:
 a) a case;
 b) a liquid electrolyte partially filling said case;
 c) a support structure;
 d) an anode immersed within said electrolyte and held in position by said support structure;
 e) a porous cathode arrangement at the surface of said electrolyte, said cathode arrangement having a cathode, with a portion thereof being within said electrolyte and the remainder thereof being above said surface, said cathode arrangement being constructed and arranged to float at said surface and being vertically moveable relative to said anode as the level of said electrolyte drops; and
 f) means for making electrical contact with said anode and said cathode.

2. A battery according to claim 1 wherein:
 a) said cathode is a reticulate.

3. A battery according to claim 2 wherein:
 a) said reticulate is a metallic foam.

4. A battery according to claim 3 wherein:
 a) said metallic foam is a nickel foam.

5. A battery according to claim 1 which includes:
 a) an oxygen reduction catalyst on the surface of said reticulate.

6. A battery according to claim 5 which includes:
 a) a hydrophobic coating of fluorinated ethylene-propylene disposed on said catalyst.

7. A battery according to claim 1 wherein:
 a) said cathode arrangement includes a float collar connected to said cathode.

8. A battery according to claim 7 wherein:
 a) said float collar completely surrounds said cathode.

9. A battery according to claim 7 wherein:
 a) said cathode arrangement covers substantially the entire surface of said electrolyte.

10. A battery according to claim 8 wherein:
 a) said cathode arrangement is circular.

11. A battery according to claim 7 wherein:
 a) said cathode includes a top surface and a bottom surface;
 b) said float collar includes a top surface and a bottom surface; and wherein
 c) said bottom surface of said cathode is even with said bottom surface of said float collar.

12. A battery according to claim 1 which includes:
 a) an electrical lead connected to said cathode by means of a silver epoxy.

13. A battery according to claim 7 which includes:

a) a plurality of vertical rods; and wherein b) said float collar includes a plurality of cutouts for respectively receiving individual ones of said rods whereby said cathode arrangement can float at the surface of said electrolyte as the level of said electrolyte changes, without said electrode arrangement twisting.

14. A battery according to claim 1 wherein:

a) said anode has a major active surface which is substantially horizontal.

15. A battery according to claim 1 wherein:

a) said anode has a major active surface which is substantially vertical.

16. A battery according to claim 15 wherein:

a) said battery includes a plurality of said anodes.

* * * * *